April 4, 1939. C. C. CHARTIER 2,152,729
UNIVERSAL TOOL SHARPENING AND WORK HOLDER
Filed Aug. 26, 1935  3 Sheets-Sheet 1
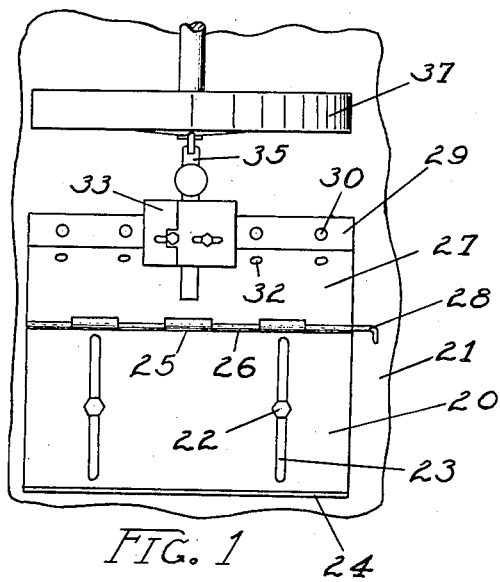
FIG. 1
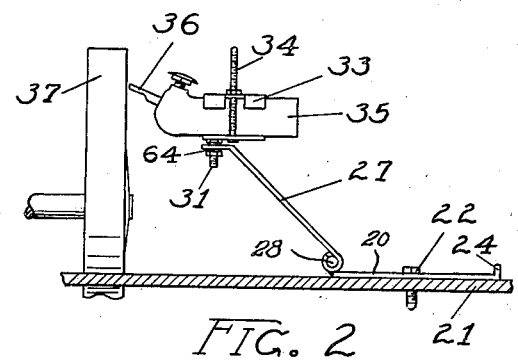
FIG. 2
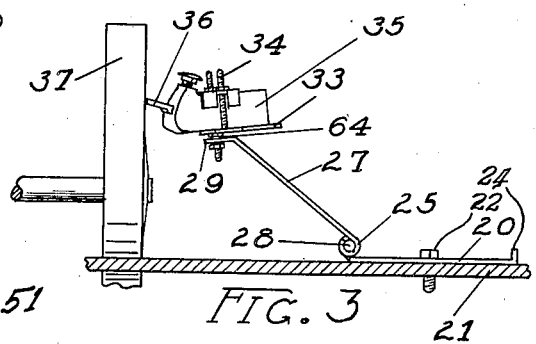
FIG. 3
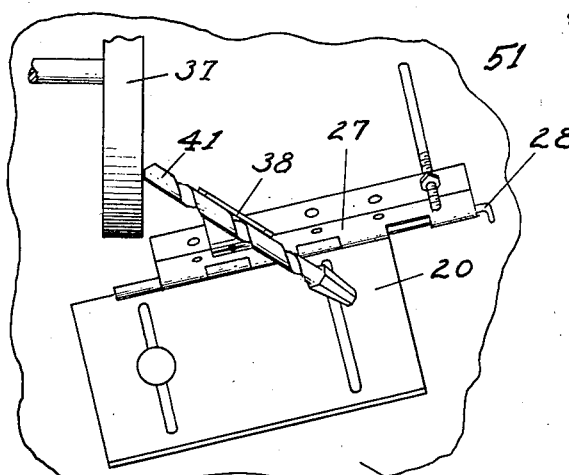
FIG. 4
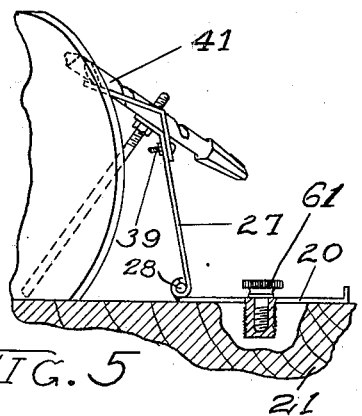
FIG. 5
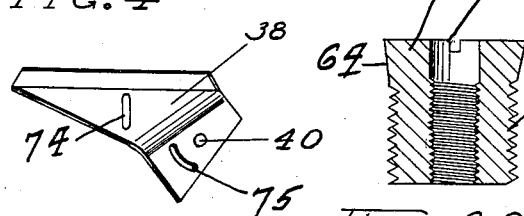
FIG. 6  FIG. 20
CURTIS C. CHARTIER
INVENTOR
PER 
ATTORNEY April 4, 1939.　　　C. C. CHARTIER　　　2,152,729
UNIVERSAL TOOL SHARPENING AND WORK HOLDER
Filed Aug. 26, 1935　　　3 Sheets-Sheet 2

CURTIS C. CHARTIER
INVENTOR

PER　Albert J. Fike
ATTORNEY

April 4, 1939. C. C. CHARTIER 2,152,729
UNIVERSAL TOOL SHARPENING AND WORK HOLDER
Filed Aug. 26, 1935 3 Sheets-Sheet 3

CURTIS C. CHARTIER
INVENTOR

PER *Albert J. Fihe*
ATTORNEY

Patented Apr. 4, 1939

2,152,729

UNITED STATES PATENT OFFICE 2,152,729

UNIVERSAL TOOL SHARPENING AND WORK HOLDER

Curtis C. Chartier, Chicago, Ill.

Application August 26, 1935, Serial No. 37,800

1 Claim. (Cl. 51—219)

This invention relates to an improved universal tool sharpening and work holder, and has for one of its principal objects, the provision of a simple yet efficient tool sharpening and work holder which is adapted to be used in combination with a grinding wheel or the like for the sharpening of various tools and with a degree of accuracy not possible by hand.

One of the important objects of the invention is to provide a tool sharpening and work holder which is relatively inexpensive, but which will, at the same time, provide means for sharpening a variety of tools and for performing a number of related and different operations with a grinding wheel or the like, which means is ordinarily found only in very expensive and much more elaborate equipment.

Another object of the invention is to provide means for readily and accurately holding various tools or other implements or even parts to be machined or otherwise operated on in desired and correct position with regard to an operating member such as a grinding wheel or the like, which device is composed of a minimum number of relatively simple parts which are interchangeably related to each other and some of which are also interchangeable with other parts so that a large number of combinations of tool-holding structures together with a correspondingly large number of tool-holding positions can be readily accomplished.

Another and still further important object is to provide in a tool-holding apparatus, means for shifting the same in various planes and at various angles to produce an accurate grinding, sharpening or other operation.

Another object is to provide means for producing an accurate hollow ground edge on various tools which is, of course, desirable, but which heretofore has been throught impossible without expensive equipment.

A still further object is the provision of means for mounting a wheel-dressing element in conjunction with the grinding wheel so that the grinding wheel can be trued to desired contour after wear, and the apparatus includes means for accurately yet simply trueing the wheel with such dressing apparatus.

Other and further important objects of the invention will be apparent from the disclosures in the accompanying drawings and following specification.

The invention, in a preferred form, is illustrated in the drawings and hereinafter more fully described.

In the drawings:

Figure 1 is a top plan view of the improved universal tool sharpening holder of this invention, showing the same in one representative position as related to a grinding wheel and with a tool mounted in the holder for a sharpening operation thereon.

Figure 2 is a side elevation of the device shown in Figure 1, showing the apparatus in substantially the same position as that illustrated in Figure 1.

Figure 3 is a view somewhat similar to that of Figure 2, only showing the holder with the tool to be sharpened in a different position whereby the desired rounded sharpened edge is obtained.

Figure 4 is a top plan view of the device, showing the same in a position slightly different from that illustrated in Figure 1 and holding a drill bit or the like for an accurate sharpening process.

Figure 5 is a side elevation of the structure shown in Figure 4.

Figure 6 is a perspective view of the particular type of holder for the drill bit which holder is illustrated in Figures 4 and 5.

Figure 20 is an enlarged detail view of the base positioning and fastening means illustrated in Figure 5.

Figure 21 is a detail view, partly in section, of a clamping means for drill bits and similar elements to be sharpened or otherwise worked on.

As shown in the drawings:

Figure 21:
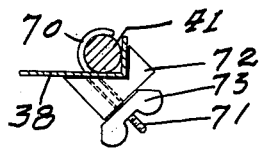

The reference numeral 20 indicates generally the base plate or main supporting element of this invention, the same adapted to be applied to a work bench or table 21 by means of bolts or the like 22 passing through slots 23 in the plate 20.

A special form of fastening means is shown in Figures 5 and 20 wherein a bolt 61 has a shank which passes through the plate 20 and into fitting 62 which is countersunk in the work bench 21, this fitting having internal screw threads for the reception of the bolt 61 and external screw threads 63 together with a wedge-shaped head 64 for better positioning and gripping relationship with a correspondingly shaped recess in the work bench 21. Slots 65 are provided in the top of the element 62 so that the same can be readily inserted into a work bench or removed therefrom by means of a screwdriver or the like.

The plate 20 has one up-turned edge in the form of a ridge or the like 24 and the other edge is shaped into a series of hinge structures 26 complementary to similar hinge structures 26 integral with a cooperating plate 27 (Figures 1, 2 and 3). A removable hinge pin 28 is provided so that these two elements 20 and 27 can be removably fastened together in hinged relationship.

The upper edge of the plate 27 is bent over slightly as illustrated at 29, and this portion is provided with a series of openings 30 adapted for the passage of fastening bolts or the like 31 therethrough, and another series of openings 32 is provided in the plate 27 adjacent and just below the turned-over edge 29 (Figure 1).

This provides for the attachment of quite a number of various holders or bracket elements thereto such as, for example, the plates 33 and the bolts 31 shown in Figures 2 and 3 which, in turn, hold a tool gripping element 35 in desired position on the hinged plates. This tool gripping element is that ordinarily used to support a cutting tool or the like 36 which, in this instance, instead of being used for a cutting operation is maintained in the holder for sharpening purposes and is adapted to be held against a grinding wheel 37 for such sharpening operation.

Figure 19:
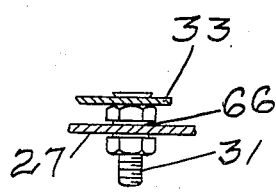
Figure 19 is a detail view, partly in section, of the swiveled mounting shown in Figures 2 and 3.

It will be noted from a study of Figures 2 and 3 that the tool holder with the tool 36 can be shifted from the uppermost position as shown in Figure 2 to a lower position as illustrated in Figure 3, while, at the same time, the tool holder 35 is moved around its pivotal support which, in this instance, happens to be a bolt 31 passing through a washer 66 rotatably positioned in one of the openings 30 in the plate 27 (Figure 19). This allows the production of an accurately rounded cutting edge on the tool 36, and it will be readily understood that such an operation is ordinarily quite difficult, especially if attempted to be performed by hand.

As shown in Figure 4, the plate 20 is used to support the complementary plate 27 in another position, the hinge pin 28 being removed and then replaced after relative shifting of the plates, and in this instance, a different type of tool support 38 is provided which is mounted on the plate 27 by means of a bolt 39, this tool supporting element 38 being shaped as best shown in Figure 6, and having an opening 40 in one portion thereof for the reception of the bolt 39.

Figure 17:
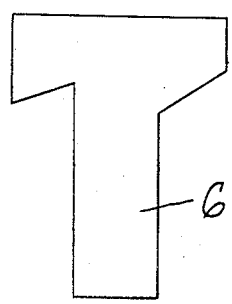
Figure 17 is a plan view of a gauge to be used in connection with drill-bit sharpening operations.

This particular embodiment is adapted for the sharpening of a drill bit 41 which is held at a desired angle, the angle being predetermined by means of the gauge 67 shown in Figure 17, and a simple rotation of the drill bit 41, while being held in sharpening relationship with the rotating wheel 37 will produce a desired rounded angular cutting edge thereon. This is another operation which ordinarily requires an expensive complicated machine to produce anything like a satisfactory result, but which here can be simply, easily and readily accomplished with a minimum of time and effort, and also without the necessity of any great amount of special skill or technique.

Figure 7:
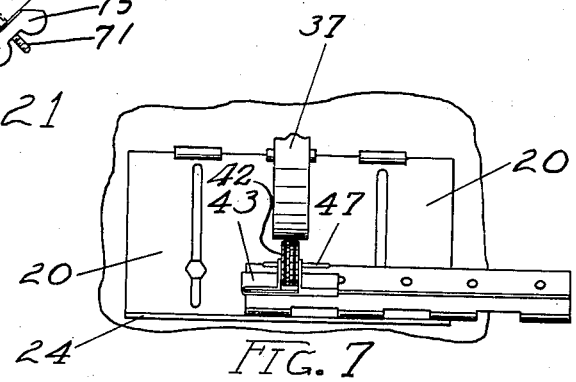
Figure 7 shows the apparatus in still another position and supporting a wheel-dressing tool.

In Figure 7 is illustrated a further variation of the apparatus which is adapted for the accurate dressing of the grinding wheel 37 when such dressing becomes necessary, the plate 27 being shifted from its hinged relationship with the plate 20 to a simple swinging support against the upturned ledge 24 at the rear end of the plate 20, and thereby allowing of a slidable movement of the plate 27 with respect to the plate 20 while, at the same time, assuring a desired movement in one plane only.

Figure 16:
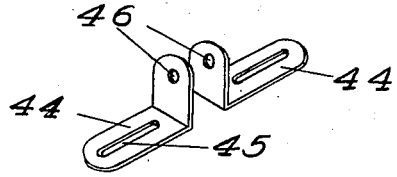
Figure 16 is a perspective view of the brackets or holders adapted to be used with the structures of Figures 13, 14 and 15.

A wheel-dressing tool 42 is mounted on the upturned edge 29 of the plate 27, this being by means of a suitable special supporting bracket 43 as best shown in Figure 7, but obviously this particular type of supporting bracket may be changed, and one such as shown in two parts at 44 in Figure 16 may be substituted therefor, the slots 45 being for the reception of bolts adapted to secure these brackets to the element 29 and the aligned openings 46 being for the reception of the wheel-dressing supporting spindle 47 (Figure 7).

Figure 9:
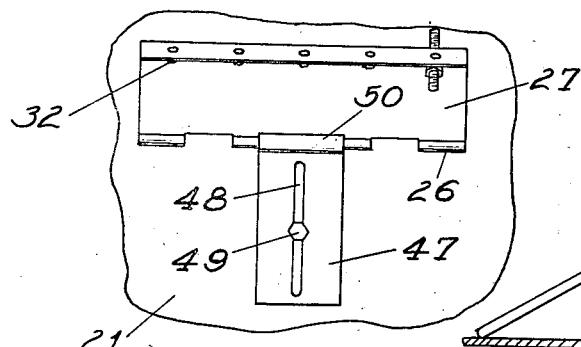
Figure 9 shows a modification of the apparatus, illustrating a form whereby the same is adapted for turning through a greater angle or circuit than is possible with the construction shown in the preceding figures.
Figure 10:
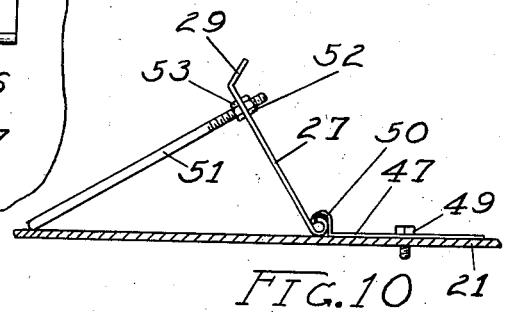
Figure 10 is a side elevation of the device of Figure 9, showing an additional dressing element applied thereto.

In Figures 9 and 10 is shown a further modification of the invention wherein a smaller supporting plate 47 is used instead of the original base plate 20, this having a single slot 48 and a single grinding bolt 49 about which the plate 47 may be pivotally shifted, if desired, thereby providing for a turning movement of the whole apparatus including the plate 27 which, in this instance, is held in desired position by having a hooked over integral portion 50 of the plate 47 fitted over and into gripping relationship with the hinged elements 26 of the plate 27.

A supporting bracket is passed through one of the holes 32 of the plate 27, this bracket being shown at 51 in Figure 10 and being held in position by means of a suitable nut or the like 52 operating against another nut or a shoulder 53 thereon. This enables a proper angular positioning of the plate 27 with respect to the bench or table 21 and also a proper angular positioning of any tool or other element so far as its relationship with the grinding wheel 37 is concerned.

Figure 8:
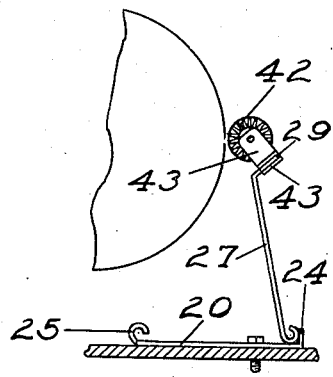
Figure 8 is a side elevation of the structure shown in Figure 7.
Figure 11:
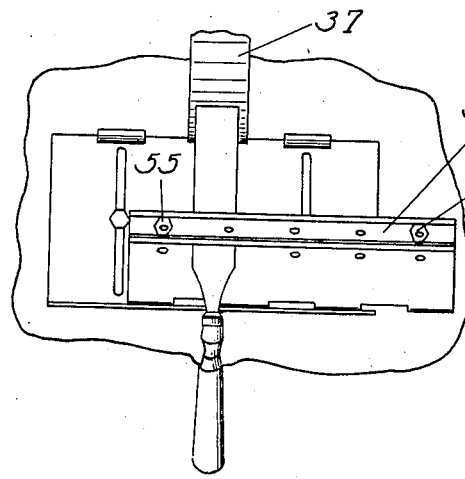
Figure 11 illustrates a further embodiment of the invention showing the same with another attachment thereon and in a position only slightly different from the positions of Figure 7 and 8, but adapted to hold a chisel or similar tool for a hollow grinding sharpening operation.
Figure 12:
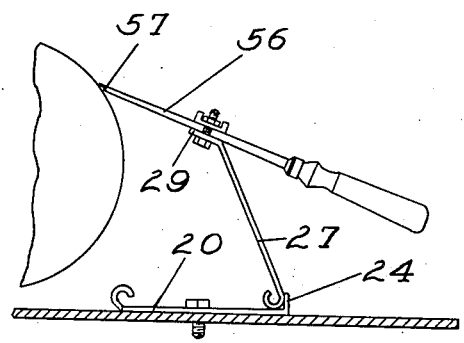
Figure 12 is a side elevation of the structure shown in Figure 11.

In Figures 11 and 12 is shown a further modification of the invention wherein another clamping element 54 is adapted to be associated with the inturned edge of the plate 27 by means of suitable clamping bolts or the like 55, and this, in turn, holds a different type of tool such as a chisel or the like 56, which, by holding against the curved face of the grinding wheel 37 can be given an accurate hollow ground edge such as shown at 57 in Figure 12. The same can be moved across the face of the wheel 37 by sliding the plate 27 relatively to the plate 20, the lower edge of the plate 27 being positioned against the upturned ledge 24 of the plate 20 in somewhat the same relationship as shown in Figure 8.

Figure 13:
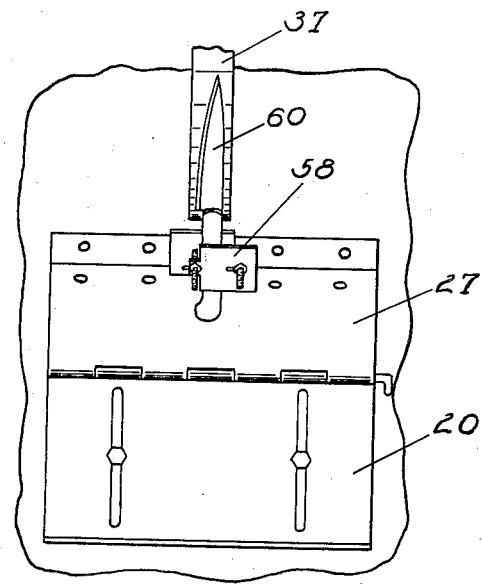
Figure 13 illustrates another embodiment of the invention with a different attachment, for example, one adapted to hold a knife or the like for a sharpening operation.
Figure 14:
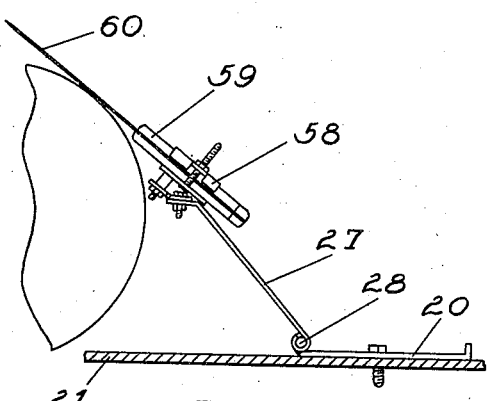
Figure 14 is a side elevation of the structure of Figure 13, showing the same in one position.
Figure 15:
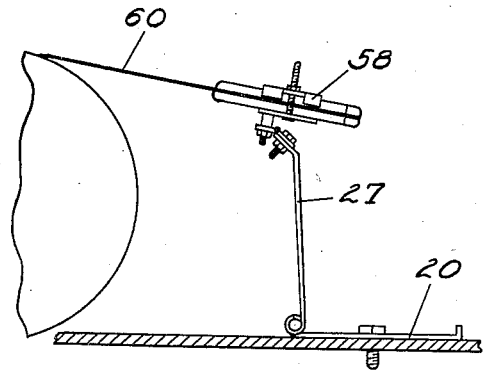
Figure 15 is a similar side elevation showing the sharpening apparatus in a different position.

A still further embodiment of the invention is shown in Figures 13, 14 and 15, illustrating the same as adapted for the sharpening of a knife or the like, the plate 27 being hingedly associated with the plate 20 somewhat in the same relationship as in Figure 1, but with a different type of bracket or support 58 mounted thereon comprising a suitable combination of plates and bolts adapted to grip a knife handle or the like 59 having a blade 60.

As shown in Figures 14 and 15, the plate 27 can be rotatably shifted about the hinge 28 on the plate 20, thereby moving the blade 60 into various positions with regard to the wheel, and at the same time the angular relationship of the blade is maintained as originally set or desired on account of the locked position of the bracket 58.

The gauge, illustrated in Figure 17, comprises one piece of metal or the like in the shape of a T, and the angular edge of a drill bit or the like 41 can be preliminarily measured in such a gauge, and then such angular relationship maintained during the sharpening operation by putting the point of the drill bit into the preliminarily set gauge at any desired or convenient time during the operation.

Figure 18:
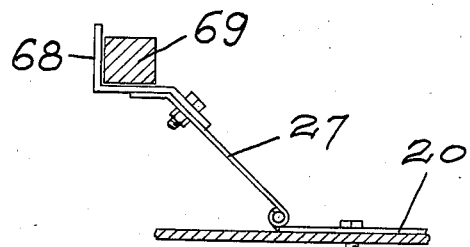
Figure 18 is a sectional view showing an adaptation of the invention.

In Figure 18 is shown a further adaptation of the invention wherein the plate 27 has mounted thereon an angular holding element 68 somewhat similar to the support 38 shown in Figure 6, but which is adapted for the reception and proper positioning of a tool or some other piece of work to be operated upon, such as, for example, a square piece of steel or the like 69.

As best illustrated in Figure 21, a drill bit or similar instrument can be securely clamped in position in the tool or work holder 38 by means of a hook or the like 70 which has a screw-threaded shank 71, the same passing through a corresponding opening in a block 72 which is shaped to fit the outside contour of the element 38, and a wing nut 73 is provided for proper tightening of the clamping hook in position. This, of course, passes through a suitable slot or opening in the element 38 which is best shown at 74 in Figure 6. A curved slot 75 is also provided in another face of the element 38, this curved slot being formed on a radius which has for its center the central point of the opening 40, and a suitable bolt with a wing nut thereon can be passed through the slot 75 and through one of the openings 30 or 32 in the plate 27 so that a further angular adjustment of this support 38 with respect to the plate 27 can be made and retained as desired.

It will be evident that herein is provided a universal sharpening tool which can be adapted for use with an ordinary grinding wheel and which will accurately and quickly put a desired cutting edge upon almost any type of tool with a minimum of effort, both so far as preparation and actual operation is concerned, and, furthermore, the entire apparatus is simple of construction, but, on account of its various modifications can be adapted for use with a great multiplicity of tools and other implements including various operations and will meet almost any contingencies which might arise in connection with the handling, sharpening and operation of metal and woodworking tools. The degree of accuracy obtained is remarkable in view of the simple nature of the entire apparatus, and the construction of the same is such that a proper preliminary setting of the same will almost automatically produce a desired and practically perfect result.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A universal sharpening tool and work holder comprising a base plate, means to fixedly position same on a work bench in conjunction with a grinding wheel, a supporting plate hingedly and shiftably mounted on the base plate, and means on the supporting plate for pivotally and shiftably retaining a tool to be sharpened, said means comprising a plate having two angular bends therein, one bend for positioning a tool to be sharpened and the other bend outlining an extension having a pivotal opening and a circular slot therein, and means for shifting the plate about said pivotal opening, said means being circumscribed by the slot.

CURTIS C. CHARTIER.